United States Patent
Fan et al.

(10) Patent No.: US 11,657,157 B2
(45) Date of Patent: May 23, 2023

(54) SECURE BOOT SYSTEM, METHOD AND APPARATUS

(71) Applicant: MACRONIX International Co., Ltd., Hsinchu (TW)

(72) Inventors: Chih-Shen Fan, Hsinchu County (TW); Chin-Shan Yuan, Taipei (TW)

(73) Assignee: MACRONIX INTERNATIONAL CO., LTD., Hsinchu (TW)

(*) Notice: Subject to any disclaimer, the term of this patent is extended or adjusted under 35 U.S.C. 154(b) by 646 days.

(21) Appl. No.: 16/434,054

(22) Filed: Jun. 6, 2019

(65) Prior Publication Data

US 2020/0387612 A1  Dec. 10, 2020

(51) Int. Cl.
*G06F 21/57* (2013.01)
*H04L 9/32* (2006.01)

(52) U.S. Cl.
CPC .......... *G06F 21/575* (2013.01); *G06F 21/572* (2013.01); *H04L 9/3249* (2013.01); *H04L 9/3252* (2013.01)

(58) Field of Classification Search
CPC ... G06F 21/575; G06F 21/572; H04L 9/3249; H04L 9/3252
See application file for complete search history.

(56) References Cited

U.S. PATENT DOCUMENTS

| | | | |
|---|---|---|---|
| 9,509,502 B2 | 11/2016 | Schulz | |
| 10,205,588 B2 | 2/2019 | Hunacek et al. | |
| 2009/0132797 A1* | 5/2009 | Lo | G06F 9/4416 713/2 |
| 2014/0040605 A1* | 2/2014 | Futral | G06F 21/572 713/2 |
| 2015/0263855 A1 | 9/2015 | Schulz | |
| 2018/0075242 A1* | 3/2018 | Khatri | H04L 9/3263 |
| 2019/0065750 A1* | 2/2019 | Bolan | G06F 21/64 |
| 2019/0108347 A1* | 4/2019 | Ghetie | G06F 9/22 |
| 2019/0163910 A1* | 5/2019 | Moon | G06F 21/572 |
| 2020/0334360 A1* | 10/2020 | Inaba | G06F 21/572 |

FOREIGN PATENT DOCUMENTS

| | | |
|---|---|---|
| CN | 204216908 | 3/2015 |
| CN | 105005721 | 7/2018 |
| TW | 200915183 | 4/2009 |
| TW | I623853 | 5/2018 |

OTHER PUBLICATIONS

"Office Action of Taiwan Counterpart Application", dated Dec. 3, 2020, pp. 1-5.

* cited by examiner

*Primary Examiner* — Jaweed A Abbaszadeh
*Assistant Examiner* — Hyun Soo Kim
(74) *Attorney, Agent, or Firm* — J.C. Patents

(57) ABSTRACT

A secure boot system, a secure boot method, and a secure boot apparatus, adapted for a boot apparatus to boot a host device, are provided. The boot apparatus includes a storage device and a processor. In the method, the processor reads a boot code and a boot key for booting the host device from the storage device, and executes a cryptographic algorithm on the boot code by using the boot key to obtain a runtime signature. Besides, the processor reads an original signature from a secure area in the storage device and uses the same to verify the runtime signature. If the runtime signature and the original signature are consistent with each other, the processor provides the boot code for the host device to execute a boot operation.

18 Claims, 6 Drawing Sheets

SECURE BOOT SYSTEM, METHOD AND APPARATUS

BACKGROUND

Field of the Disclosure

The present disclosure relates to a system, a method and an apparatus for booting a computer, and more particularly to a secure boot system, a secure boot method and a secure boot apparatus.

Description of Related Art

A boot code or a boot loader is a program that is located on a computer or an embedded system to boot the operation system. Typically, the boot code is stored in a hard drive or a memory of the computer or the embedded system to perform the preparation of the hardware and software environment such as hardware initialization and memory configuration after the computer is powered on and executes the power on self test (POST) of the basic input/output system (BIOS) so as to load and perform the operation system or other system software.

Since there is a possibility that the boot code is stored external to a master device (e.g. CPU, SoC, MPU, or MCU) in a host, the computer or the embedded system may be hacked or invaded due to tampering with the boot code stored in an external storage device.

Regarding the method of booting by an external device, there is currently provided a security protection mechanism which modifies the read only memory code (ROM code) in the microcontroller (MCU) of the computer or the embedded system device itself so that the integrity of the boot code in the external device is verified in the booting process, thereby achieving the effect of secure booting. However, since the method requires modification of the ROM code, the maintenance costs of the microcontroller is increased. Another common approach is to verify the integrity of the external boot code through a secure boot mechanism built in a higher-order microcontroller. This approach also requires a higher-order microcontroller, which increases costs.

SUMMARY

In view of the above, the present disclosure provides a boot system, a boot method and a boot apparatus which stores the original signature for verifying the boot code in a secure area in the boot apparatus that is not accessible by the outside world, such that the boot apparatus can perform self-verification each time when performing boot operation.

The present disclosure provides a secure boot method adapted for booting a host device by a boot apparatus. The boot apparatus has a storage device and a processor. In the method, the processor reads a boot code and a boot key for booting the host device from the storage device, and executes a cryptographic algorithm on the boot code by using the boot key to obtain a runtime signature. In addition, the processor reads an original signature from a secure area of the storage device and uses the same to verify the runtime signature. Specifically, if the runtime signature is consistent with the original signature, the processor provides the boot code for the host device to perform the boot operation.

In an embodiment of the disclosure, the step of verifying the runtime signature further includes prohibiting, by the processor, providing the boot code to the host device if the runtime time signature is inconsistent with the original signature and setting the status flag to a fail status.

In an embodiment of the disclosure, the step of performing a cryptographic algorithm on the boot code by using the boot key includes generating, by the processor, a digest from the boot code by using a checking method and signing, by the processor, the digest with the boot key by using a cryptographic algorithm, thereby generating the runtime signature.

The disclosure provides a secure boot apparatus including a storage device and a processor. Specifically, the secure boot apparatus is configured to connect to a host device. The storage device is configured to store a boot code and a boot key for booting the host device. The processor is coupled to the storage device, and configured to read the boot code and the boot key from the storage device, and perform a cryptographic algorithm on the boot code by using the boot key to obtain a runtime signature. Additionally, the processor reads the original signature from the secure area of the storage device and uses the original signature to verify the runtime signature. Specifically, if the runtime signature is consistent with the original signature, the processor provides the boot code for the host device to perform the boot operation.

The present disclosure provides a secure boot system that includes a host device and a boot apparatus. The boot apparatus includes a storage device, and a processor. The boot apparatus is configured to connect to the host device. The storage device is configured to store a boot code and a boot key for booting the host device. The processor is coupled to the storage device, and configured to read the boot code and the boot key from the storage device, and perform a cryptographic algorithm on the boot code by using the boot key to obtain a runtime signature. Additionally, the processor reads the original signature from the secure area of the storage device and uses the original signature to verify the runtime signature. Specifically, if the runtime signature is consistent with the original signature, the processor provides the boot code for the host device to perform the boot operation.

In an embodiment of the disclosure, the boot key is stored in the secure area of the storage device.

In an embodiment of the disclosure, if the runtime signature is inconsistent with the original signature, the processor prohibits providing the boot code to the host device and sets a status flag to a fail state.

In an embodiment of the disclosure, the processor includes generating a digest from the boot code by using a checking method and signing the digest with the boot key by using a cryptographic algorithm, thereby generating the runtime signature.

In an embodiment of the disclosure, the checking method includes calculating a checksum, a cyclic redundancy check (CRC) code, or a hash value of the boot code to generate the digest.

In an embodiment of the disclosure, the cryptographic algorithm includes an RSA (Rivest-Shamir-Adleman) algorithm, a digital signature algorithm (DSA), or an elliptic curve digital signature algorithm (ECDSA).

In order to make the aforementioned features and advantages of the disclosure more comprehensible, embodiments accompanying figures are described in detail below.

DESCRIPTION OF EMBODIMENTS

In the embodiment of the present disclosure, before a boot apparatus is shipped from the factory, an original signature used to verify a boot code is stored in a secure area in the storage device that cannot be accessed from the outside. In this manner, whenever the user wants to use the boot apparatus to boot the host device, the boot apparatus performs a cryptographic algorithm on the boot code by using the boot key stored in the storage device to obtain a runtime signature, uses the original signature stored in the secure area for verifying the runtime signature, and provides the boot code to the host device when the verification is successful. Through the above method, the boot apparatus can be self-verified and a secure boot operation can be implemented without modifying the program code of the apparatus.

Figure 1:
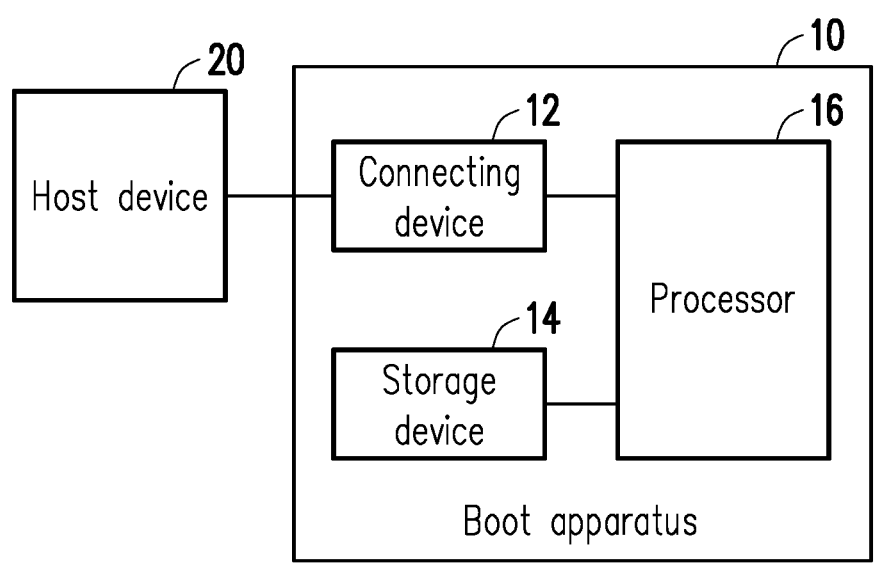
FIG. 1 is a block diagram of a secure boot system according to an embodiment of the disclosure.

FIG. 1 is a block diagram of a secure boot system according to an embodiment of the disclosure. Referring to FIG. 1, a secure boot system 1 includes a boot apparatus 10 and a host device 20. The host device 20 is, for example, a computing device such as a microcontroller (MCU), a system on a chip (SoC), an application processor (AP), a computer, a workstation, or a server which needs to execute the boot code in each boot operation (power-on or reset) to load and execute the operation system or other system software. The boot apparatus 10 is, for example, an external storage device such as an embedded multimedia card (eMMC), an embedded universal flash storage (eUFS), an embedded solid-state drive (eSSD), a flash drive, a memory card, a portable hard disk, and the like provided separately from the host device 20, and includes a connecting device 12, a storage device 14, and a processor 16. The processor 16 is coupled to the connecting device 12 and the storage device 14, and can access and execute the instructions recorded in the storage device 14 to implement the secure boot method of the embodiment of the present disclosure.

The connecting device 12 is, for example, an interface device connected to the host device 20 in any wired or wireless manner, for example, a device that supports interfaces such as universal serial bus (USB), RS232, bluetooth (BT), and wireless fidelity (Wi-Fi), and the like, the embodiment is not limited thereto.

The storage device 14 is, for example, any type of static or dynamic random access memory (RAM), a read-only memory (ROM), a flash memory or other similar devices or a combination thereof, and is configured to store one or more instructions that can be executed by the processor 16. The instructions may be loaded by the processor 16 and executed by the processor 16.

The processor 16 is, for example, a central processing unit (CPU), or other programmable general-purpose or specific-purpose microprocessor, microcontroller (MCU), digital signal processor (DSP), programmable controller, application specific integrated circuits (ASIC), programmable logic device (PLD) or other similar devices or a combination of these devices; the embodiment provides no limitation thereto.

Figure 2:
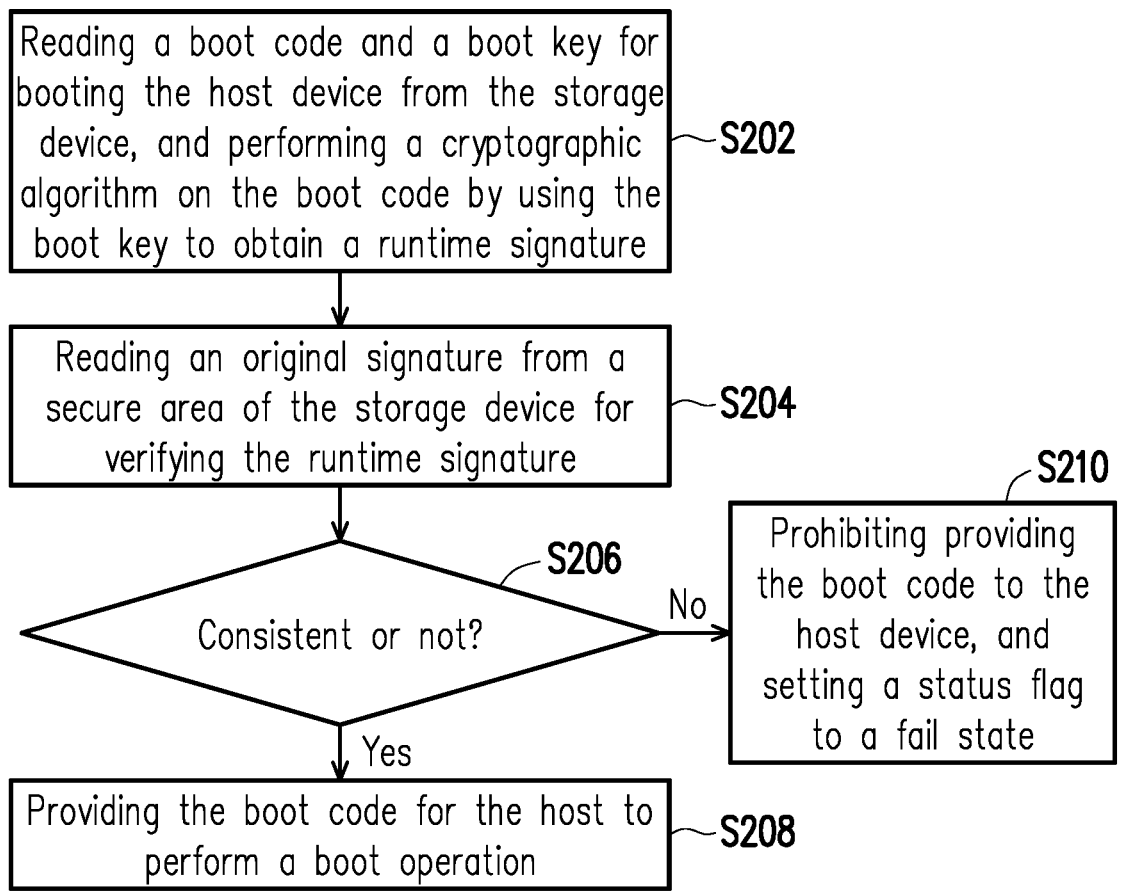
FIG. 2 is a flow chart of a secure boot method according to an embodiment of the disclosure.

FIG. 2 is a flow chart of a secure boot method according to an embodiment of the disclosure. Referring to FIG. 1 and FIG. 2, the method of the present embodiment is adaptable for the above-mentioned boot apparatus 10, and the detailed steps of the secure boot method of the present embodiment will be described below with reference to the various devices and components of the boot apparatus 10.

First, in step S202, the processor 16 reads the boot code and the boot key for booting the host device 20 from the storage device 14 of the boot apparatus 10 itself, and utilizes the boot key to perform a cryptographic algorithm on the boot code to obtain a runtime signature. Specifically, the processor 16, for example, performs the operations of step S202 after receiving a boot signal sent by the host device 20 by using the connecting device 12. The host device 20 sends the boot signal to the boot apparatus 10 connected thereto, for example, when receiving a user's boot operation such as power-on or reset, or when a reboot operation is triggered by the host device 20 itself.

In one embodiment, the boot key is, for example, a character string of a length of 128 bits to 256 bits predetermined by the manufacturer of the boot apparatus 10 for the boot apparatus 10, but the embodiments is not limited thereto. The boot key is, for example, stored in the storage device 14 of the boot apparatus 10 before the boot apparatus 10 is shipped from the factory. In addition, the boot code is, for example, a program that can be used by the host device 20 to perform the boot operation, and is, for example, stored in a boot partition in the storage device. In this manner, each time the processor 16 of the boot apparatus 10 receives the boot signal, the boot code and the boot key are read and used to execute the cryptographic algorithm, thereby obtaining a runtime signature. This signature is, for example, a character string with a length of 128 or 256 bits, and can be used to verify the integrity of the boot code.

In detail, after reading the boot code and the boot key, the processor 16 executes, for example, a checking method to generate a digest from the boot code. The checking method, for example, calculates the checksum, the CRC code or the hash value of the boot code; the disclosure provides no limitation thereto. Then, the processor 16 further uses the cryptographic algorithm and signs the digest with the boot key to generate the runtime signature. The cryptographic algorithm is, for example, the hash-based message authentication code (HMAC), the RSA (Rivest-Shamir-Adleman) algorithm, the digital signature algorithm (DSA) or the elliptic curve digital signature algorithm (ECDSA) and so on; the disclosure is not is not limited thereto.

Returning to the flow of FIG. 2, in addition to generating the runtime signature, in step S204, the processor 16, for example, reads the original signature from the secure area of the storage device 14 and uses the read original signature to verify the generated runtime signature. Specifically, the secure area is, for example, an area where the manufacturer of the boot apparatus 10 additionally applies security measures to a certain portion of the storage device 14 by, for example, sealing the portion or covering the portion with a metal layer to prevent the portion from being exposed and being read externally. Also, it is designed that the portion will be damaged immediately and cannot be probed when the sealing or the metal layer is destructed by external force, thus ensuring that the information stored in the secure area is not taken externally. The installation area can only be, for example, accessed through a specific authentication command, that is, when the processor 16 needs to verify the runtime signature, the original signature stored in the secure area can only be read when the above authenticated command is executed.

In step S206, the processor 16 determines whether the runtime signature is consistent with the original signature. If the two are consistent, in step S208, the processor 16 provides the boot code for the host device 20 to perform a boot operation. In one embodiment, the processor 16, for example, uploads the boot code to the host device 20 by using the connecting device 12, so that the host device 20 performs a boot operation. Otherwise, in step S210, the processor 16 prohibits providing the boot code to the host device 20 and sets the status flag to a fail status. In this manner, the host device 20 can know the boot is failed by, for example, reading the status flag, and notify the user to check or replace the boot apparatus 10.

By the above method, each time the host device 20 is to be booted by using the boot apparatus 10, the boot apparatus 10 can perform self-verification to confirm the integrity of the boot code, thereby ensuring that the boot code is not modified externally and the host device 20 is not hacked externally.

Figure 3A:
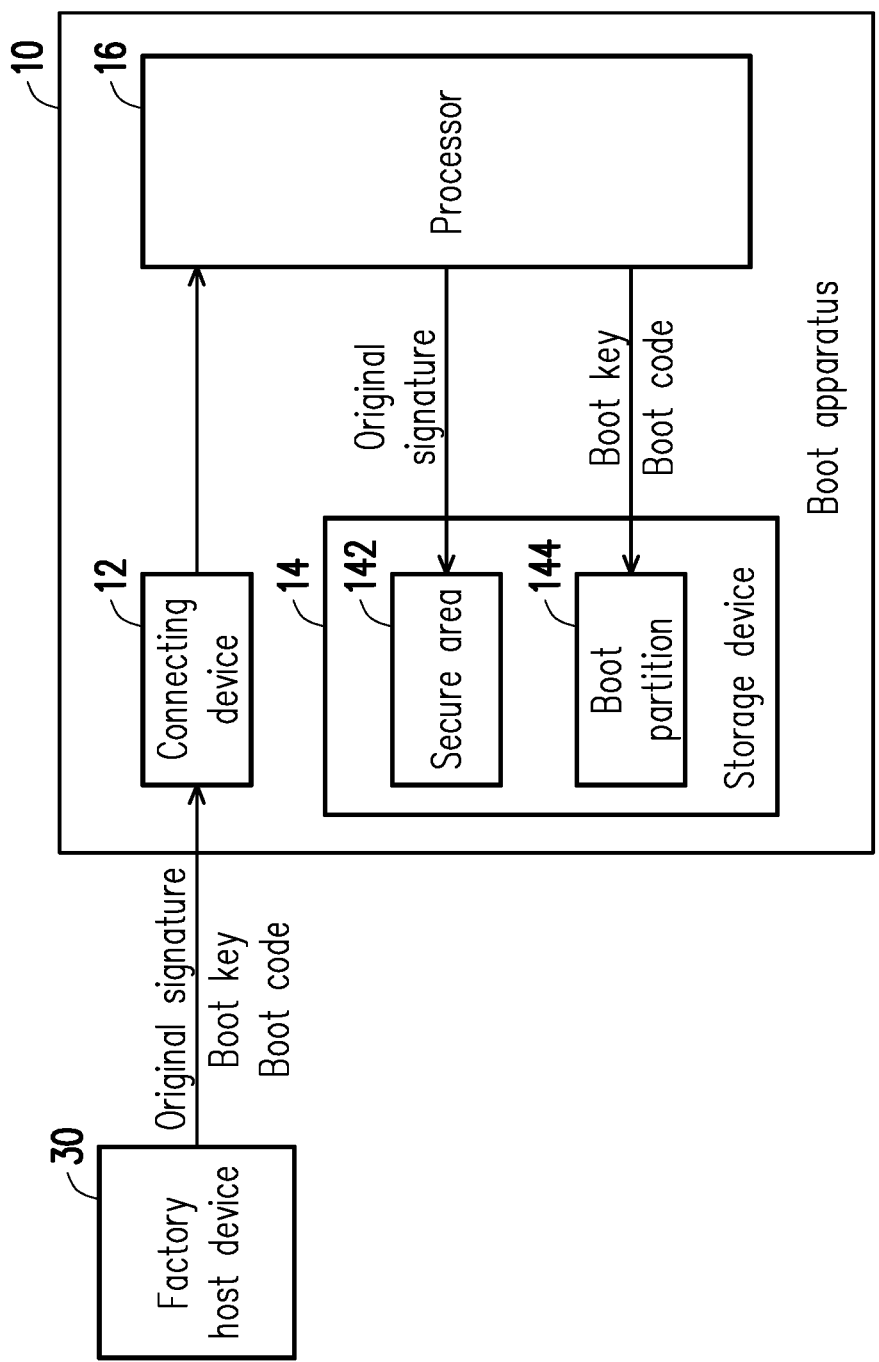
FIG. 3A and FIG. 3B illustrate examples of a secure boot method according to an embodiment of the disclosure.
Figure 3B:
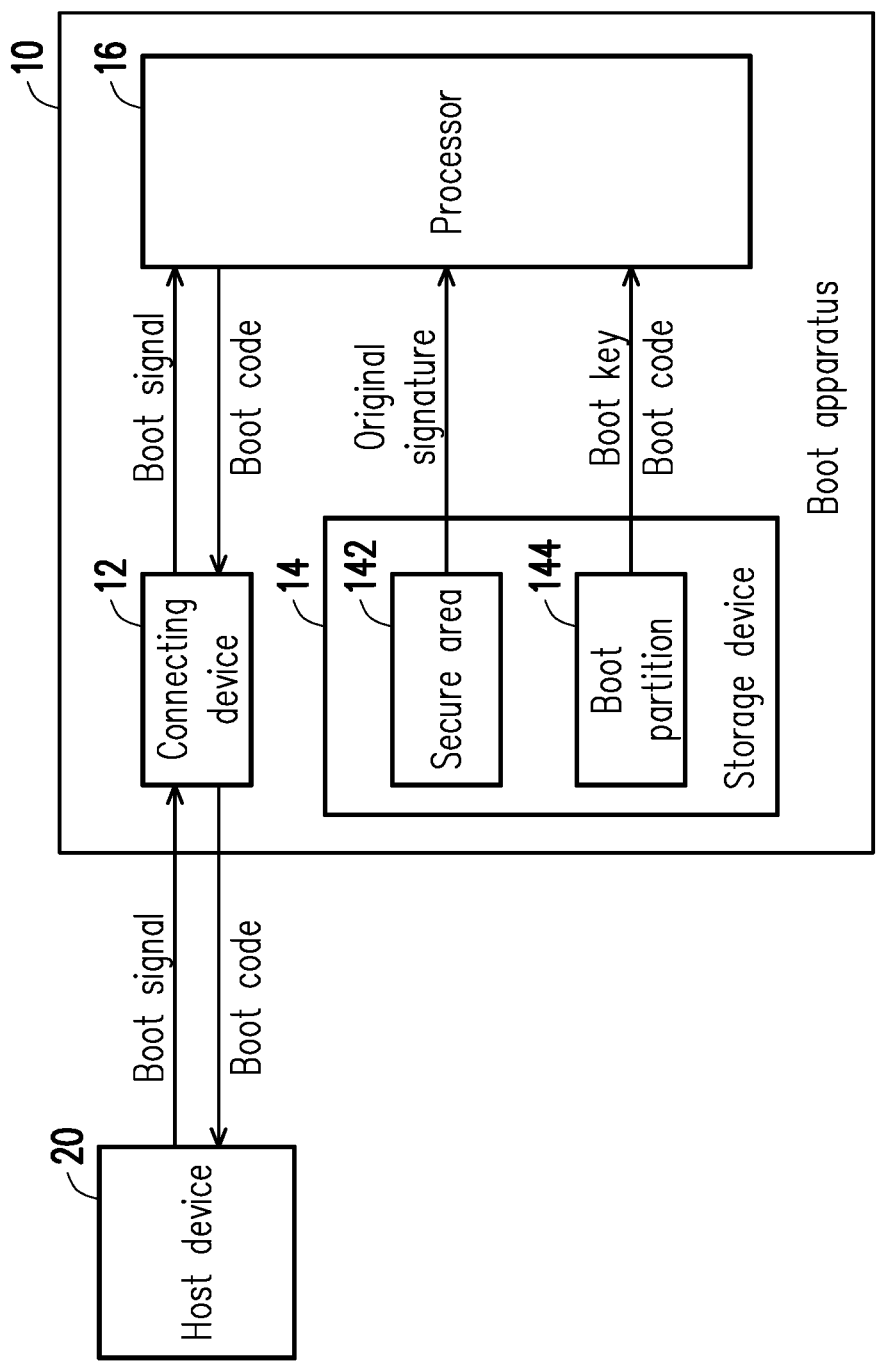

FIG. 3A and FIG. 3B illustrate examples of a secure boot method according to an embodiment of the disclosure. Referring to FIG. 3A and FIG. 3B, the embodiment describes the process flow of the secure boot method based on the structure of the secure boot system 1 in FIG. 1, wherein FIG. 3A illustrates the process flow before shipping and FIG. 3B illustrates process flow in use.

In FIG. 3A, the boot apparatus 10 receives the boot key, the boot code, and the original signature provided by a factory host device 30 through the connecting device 12. Specifically, the original signature is obtained by, for example, the factory host device 30 performing the cryptographic algorithm on the boot code by using the boot key. The detailed method is the same as the method for obtaining the runtime signature in the foregoing embodiment, and related details are omitted. After the boot apparatus 10 receives the boot key, the boot code and the original signature, the processor 16 writes the original signature into the secure area 142 in the storage device 14, and writes the boot key and the boot code into a boot partition 144 in the storage device 14. The manner of configuring the secure area 142 is the same as that of the foregoing embodiment, and related details are omitted.

In FIG. 3B, after the boot apparatus 10 receives the boot signal sent by the host device 20 through the connecting device 12, the processor 16 reads the boot key and the boot code from the boot partition 144, and uses the boot key to perform the cryptographic algorithm on the boot code to obtain or restore the runtime signature. Meanwhile, the processor 16 also reads the original signature from the secure area 142 and uses it to verify the runtime signature. When the verification is successful, the processor 16 uploads the boot code to the host device 20 through the connecting device 12, so that the host device 20 executes the boot code to perform the boot operation.

In the above embodiment, the boot key is stored with the boot code in the boot partition 144 of the storage device 14, while in other embodiments, the boot key may be stored with the original signature in the secure area 142 of the storage device 14, thereby increasing security.

Figure 4A:
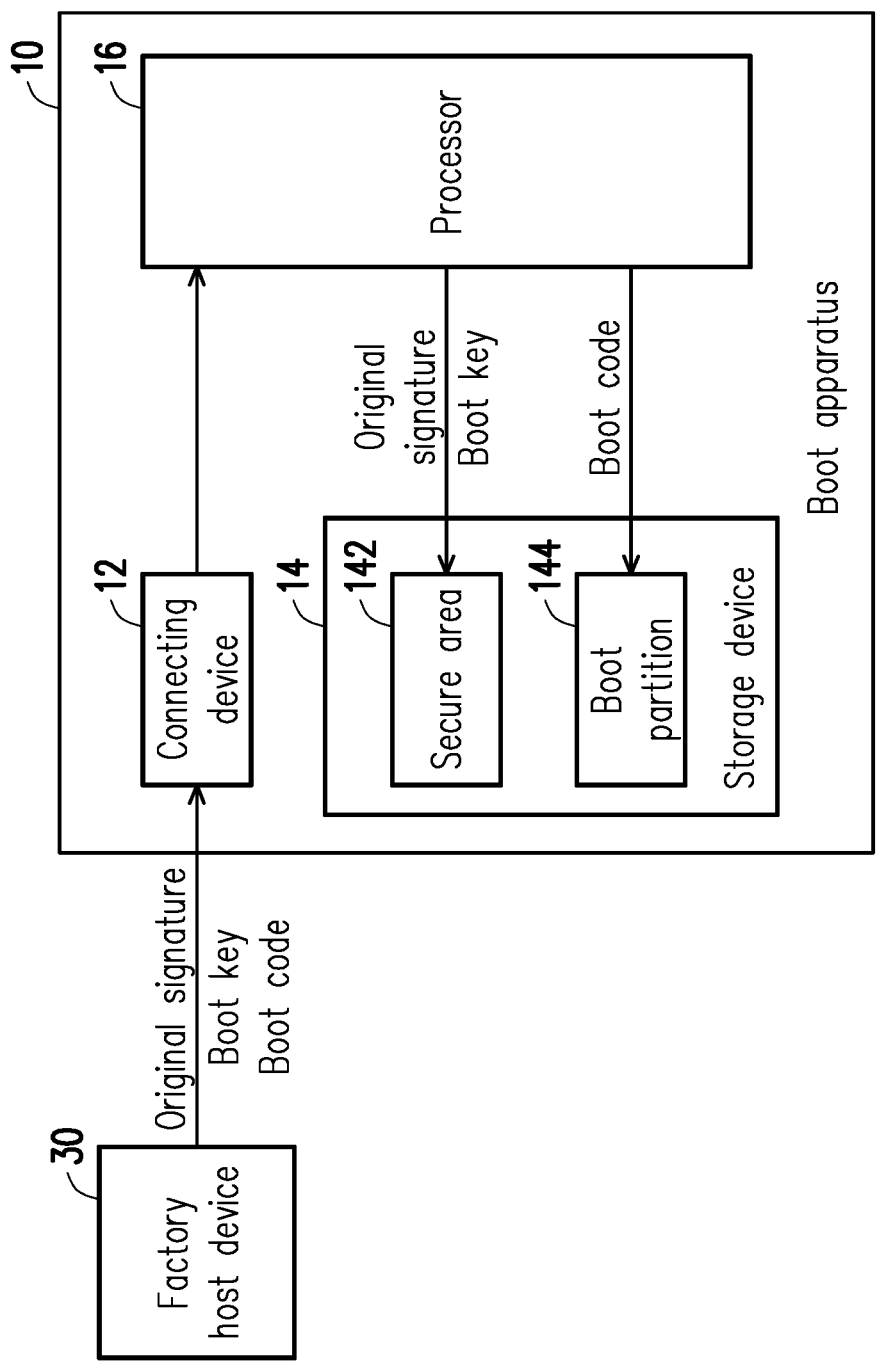
FIG. 4A and FIG. 4B illustrate examples of a secure boot method according to an embodiment of the disclosure.
Figure 4B:
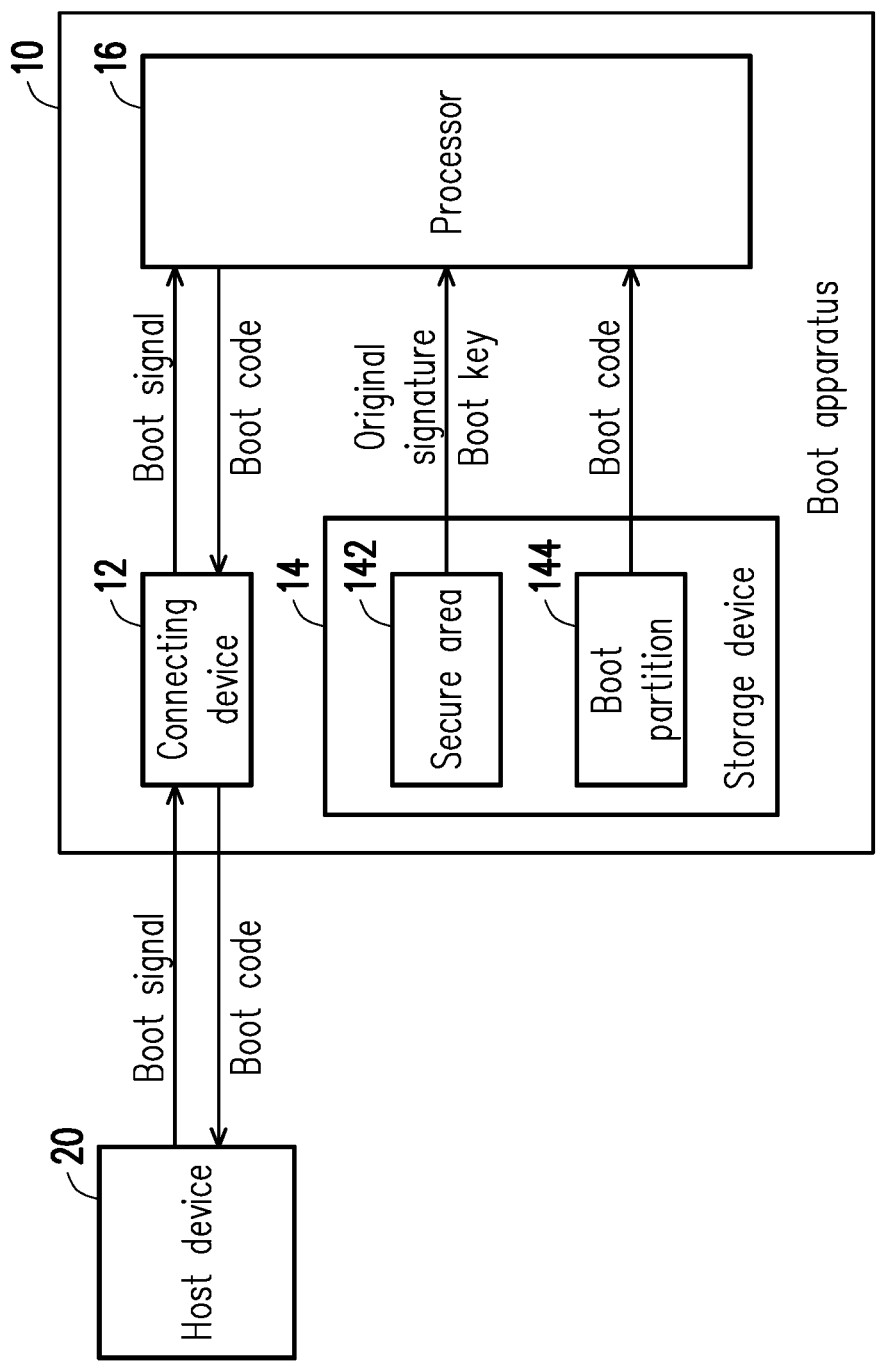

For example, FIG. 4A and FIG. 4B illustrate examples of a secure boot method according to an embodiment of the disclosure. Referring to FIG. 4A and FIG. 4B, the embodiment describes the process flow of the secure boot method based on the structure of the secure boot system 1 in FIG. 1, wherein FIG. 4A illustrates the process flow before shipping and FIG. 4B illustrates process flow in use.

In FIG. 4A, the boot apparatus 10 receives the boot key, the boot code, and the original signature provided by the factory host device 30 through the connecting device 12. Specifically, the original signature is obtained by, for example, the factory host device 30 performing the cryptographic algorithm on the boot code by using the boot key. The detailed method is the same as the method for obtaining the runtime signature in the foregoing embodiment, and related details are omitted. After the boot apparatus 10 receives the boot key, the boot code and the original signature, the processor 16 writes the original signature and the boot key into the secure area 142 in the storage device 14, and writes the boot code into the boot partition 144 in the storage device 14. The manner of configuring the secure area 142 is the same as that of the foregoing embodiment, and related details are omitted.

In FIG. 4B, after the boot apparatus 10 receives the boot signal sent by the host device 20 through the connecting device 12, the processor 16 reads the boot key and the boot code respectively from the secure area 142 and the boot partition 144, and uses the boot key to perform the cryptographic algorithm on the boot code to obtain or restore the runtime signature. Meanwhile, the processor 16 also reads the original signature from the secure area 142 and uses it to verify the runtime signature. When the verification is successful, the processor 16 uploads the boot code to the host device 20 through the connecting device 12, so that the host device 20 executes the boot code to perform the boot operation.

In summary, in the secure boot system, the secure boot method and the secure boot apparatus provided in the embodiments of the present disclosure, the original signature used to verify the boot code is stored in a secure area in the storage device that cannot be accessed from the outside, such that the boot apparatus can perform the verification process of the boot code by itself each time when receiving the boot signal of the host device. In this manner, it is possible to prevent the boot code from being tampered without amending the program code of the apparatus, thereby achieving secure boot operation of the host device.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A secure boot method, adapted to boot a host device by a boot apparatus external to the host device, the boot apparatus having a storage device and a processor, the method comprising:

receiving, by the processor, an original signature, a boot code and a boot key from the host device through a connecting device;

reading, by the processor, the boot code and the boot key for booting the host device from the storage device when the processor is connected to the host device through the connecting device, and performing, by the processor, a cryptographic algorithm on the boot code by using the boot key to obtain a runtime signature;

reading, by the processor, the original signature from a secure area of the storage device for verifying the runtime signature; and providing, by the processor, the boot code for the host device to perform a boot operation when the runtime signature is consistent with the original signature.

2. The method of claim 1, wherein the boot key is stored in the secure area of the storage device.

3. The method of claim 1, wherein the step of verifying the runtime signature further comprises:
   prohibiting, by the processor, providing the boot code to the host device and setting a status flag to a fail state if the runtime signature is inconsistent with the original signature.

4. The method of claim 1, wherein the step of performing the cryptographic algorithm on the boot code by using the boot key comprises:
   generating, by the processor, a digest from the boot code by using a checking method; and
   signing, by the processor, the digest with the boot key by using the cryptographic algorithm to generate the runtime signature.

5. The method of claim 4, wherein the checking method comprises calculating a checksum, a cyclic redundancy check (CRC) code, or a hash value of the boot code to generate the digest.

6. The method of claim 1, wherein the cryptographic algorithm comprises an RSA (Rivest-Shamir-Adleman) algorithm, a digital signature algorithm (DSA) or an elliptic curve digital signature algorithm (ECDSA).

7. A secure boot apparatus, being connected to a host device and comprising:
   a storage device, storing a boot code and a boot key for booting the host device; and
   a processor, coupled to the storage device, and configured to:
      receiving an original signature, the boot code and the boot key from the host device through a connecting device;
      reading the boot code and the boot key from the storage device when the processor is connected to the host device through the connecting device, and performing a cryptographic algorithm on the boot code by using the boot key to obtain a runtime signature;
      reading the original signature from a secure area of the storage device; and
      providing the boot code for the host device to perform a boot operation when the runtime signature is consistent with the original signature.

8. The secure boot apparatus of claim 7, wherein the boot key is stored in the secure area of the storage device.

9. The secure boot apparatus of claim 7, wherein
   the processor prohibits providing the boot code to the host device and sets a status flag to a fail state if the runtime signature is inconsistent with the original signature.

10. The secure boot apparatus of claim 7, wherein the processor comprises:
    generating a digest from the boot code by using a checking method; and
    signing the digest with the boot key by using the cryptographic algorithm to generate the runtime signature.

11. The secure boot apparatus of claim 10, wherein the checking method comprises calculating a checksum, a CRC code, or a hash value of the boot code to generate the digest.

12. The secure boot apparatus of claim 7, wherein the cryptographic algorithm comprises an RSA algorithm, a DSA or an ECDSA.

13. A secure boot system, comprising:
    a host device; and
    a boot apparatus, being connected to the host device and comprising:
       a storage device, storing a boot code and a boot key for booting the host device; and
       a processor, coupled to the storage device, and configured to:
          receiving an original signature, the boot code and the boot key from the host device through a connecting device;
          reading the boot code and the boot key from the storage device when the processor is connected to the host device through the connecting device, and performing a cryptographic algorithm on the boot code by using the boot key to obtain a runtime signature;
          reading the original signature from a secure area of the storage device; and
          providing the boot code for the host device to perform a boot operation when the runtime signature is consistent with the original signature.

14. The secure boot system of claim 13, wherein the boot key is stored in the secure area of the storage device.

15. The secure boot system of claim 13, wherein
    the processor prohibits providing the boot code to the host device and sets a status flag to a fail state if the runtime signature is inconsistent with the original signature.

16. The secure boot system of claim 13, wherein the processor comprises:
    generating a digest from the boot code by using a checking method; and
    signing the digest with the boot key by using the cryptographic algorithm to generate the runtime signature.

17. The secure boot system of claim 16, wherein the checking method comprises calculating a checksum, a CRC code, or a hash value of the boot code to generate the digest.

18. The secure boot system of claim 13, wherein the cryptographic algorithm comprises an RSA algorithm, a DSA or an ECDSA.

* * * * *